United States Patent
Jung

(10) Patent No.: US 11,856,124 B2
(45) Date of Patent: Dec. 26, 2023

(54) METHOD FOR PROVIDING PATTERN AND ELECTRONIC DEVICE FOR SUPPORTING THE SAME

(71) Applicant: Samsung Electronics Co., Ltd., Suwon-si (KR)

(72) Inventor: Yongsub Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 406 days.

(21) Appl. No.: 17/309,157

(22) PCT Filed: Apr. 28, 2021

(86) PCT No.: PCT/KR2021/005389
§ 371 (c)(1),
(2) Date: Apr. 30, 2021

(87) PCT Pub. No.: WO2022/080615
PCT Pub. Date: Apr. 21, 2022

(65) Prior Publication Data
US 2022/0217230 A1    Jul. 7, 2022

(30) Foreign Application Priority Data

Oct. 15, 2020 (KR) .................. 10-2020-0133596

(51) Int. Cl.
*H04M 1/72409* (2021.01)
*H04L 67/50* (2022.01)
*H04L 67/12* (2022.01)

(52) U.S. Cl.
CPC ........ *H04M 1/72409* (2021.01); *H04L 67/12* (2013.01); *H04L 67/535* (2022.05); *G06F 2218/02* (2023.01)

(58) Field of Classification Search
CPC .............. H04M 1/72409; H04L 67/12; H04L 67/535; H04L 12/28; H04L 12/2829; G06F 2218/02; G06N 3/02
(Continued)

(56) References Cited

U.S. PATENT DOCUMENTS 9,813,509 B1 * 11/2017 Visser ................. G06F 9/547
10,007,886 B1 * 6/2018 Khvostichenko .. G06Q 10/1093
(Continued)

FOREIGN PATENT DOCUMENTS

KR    10-2012-0071722 A    7/2012
KR        10-1283185 B1    7/2013
(Continued)

OTHER PUBLICATIONS

International Search Report and Written Opinion of the International Searching Authority in connection with International Application No. PCT/KR2021/005389 dated Jul. 27, 2021, 14 pages.

*Primary Examiner* — Don N Vo

(57) ABSTRACT

An electronic device including a communication interface, a memory, and a processor. The processor is configured to receive information related to at least one first event generated for a predetermined first time from an external electronic device and acquire a first pattern and a first parameter related to the first pattern, based on information on at least one second event generated within at least one predetermined time interval among the information on the at least one first event. The processor is configured to receive information related to at least one third event generated for a predetermined second time from the external electronic device. The processor is configured to acquire a second parameter related to the first pattern, based on the information related to the at least one third event. The processor is
(Continued)

configured to generate a first template and transmit information on the first template to a server.

15 Claims, 6 Drawing Sheets

(58) Field of Classification Search
USPC ............................................... 455/420
See application file for complete search history.

(56) References Cited

U.S. PATENT DOCUMENTS

| | | |
|---|---|---|
| 2012/0166610 A1 | 6/2012 | Doh et al. |
| 2014/0258404 A1 | 9/2014 | Choi et al. |
| 2015/0019342 A1 | 1/2015 | Gupta |
| 2015/0140990 A1 | 5/2015 | Kim et al. |
| 2015/0142385 A1* | 5/2015 | Otsuka ................ G06F 11/0751 |
| | | 702/182 |
| 2016/0205438 A1 | 7/2016 | Lee |
| 2016/0209822 A1 | 7/2016 | Pulliam et al. |
| 2016/0210680 A1 | 7/2016 | Pulliam et al. |
| 2018/0091381 A1 | 3/2018 | McLaughlin et al. |
| 2019/0007232 A1 | 1/2019 | Kim et al. |
| 2020/0120163 A1 | 4/2020 | Gargi et al. |
| 2020/0304445 A1 | 9/2020 | Dinhthi et al. |
| 2020/0372165 A1* | 11/2020 | Osaki .................... H04L 63/108 |

FOREIGN PATENT DOCUMENTS

| | | |
|---|---|---|
| KR | 20170116306 A | 10/2017 |
| KR | 20170129551 A | 11/2017 |
| KR | 10-1927706 B1 | 12/2018 |
| KR | 10-2042690 B1 | 11/2019 |
| WO | 2012/070900 A2 | 5/2012 |
| WO | 2015/030347 A1 | 3/2015 |

\* cited by examiner

METHOD FOR PROVIDING PATTERN AND ELECTRONIC DEVICE FOR SUPPORTING THE SAME

CROSS-REFERENCE TO RELATED APPLICATIONS

This application is a 371 National Stage of International Application No. PCT/KR2021/005389, filed Apr. 28, 2021, which claims priority to Korean Patent Application No. 10-2020-0133596, filed on Oct. 15, 2020, the disclosures of which are herein incorporated by reference in their entirety.

BACKGROUND

1. Field

Various embodiments of the disclosure relate to a method of providing patterns and an electronic device for supporting the same.

2. Description of Related Art

Following the rapid spread of portable electronic devices such as smart phones or tablet Personal Computers (PCs), services and additional functions provided through electronic devices have been gradually advanced. Communication service providers or electronic device manufacturers make efforts to mount various components to electronic devices and develop relevant technologies in order to increase the effective value of electronic devices and satisfy various user demands.

Recently, interest in the Internet of Things (IoT) technology for connecting objects (things) in the real word to a network, collecting context information from the objects through portable electronic devices, and controlling a surrounding environment is increasing.

The IoT technology may be applied to various environments such as a vehicle, an office, or a factory as well as the home, and may allow a user to collect environment information from a plurality of objects and analyze the collected information to control devices.

SUMMARY

An electronic device (for example, a server) may collect data related to a user from at least one electronic device located within the home. The electronic device may determine a pattern of a user on the basis of the collected data and provide (for example, recommend) the user with a configuration related to the determined pattern (for example, configuration related to the operation of the at least one electronic device) of the user. For example, the electronic device may collect data related to the user for a predetermined time period (for example, 1 week). When the user (for example, the electronic device of the user) enters the home from the outside at a predetermined time (for example, about 6:00 p.m.), the electronic device may determine a pattern of the user of turning on a light switch within the home within a predetermined time (for example, about 5 minutes) on the basis of the collected data. The electronic device may recommend a configuration for automatically turning on the light switch when the user enters the home from the outside at the predetermined time (for example, about 6 p.m.).

However, since the electronic device (for example, a server) determines a pattern related to a specific user and provides the determined pattern only to the specific user, patterns provided by the electronic device may be limited.

Various embodiments of the disclosure relate to a method of providing patterns and an electronic device for supporting the same, capable of providing (for example, recommend) patterns which can be applied to a plurality of users on the basis of data related to patterns acquired from the plurality of users (for example, electronic devices of the plurality of users).

The technical subjects pursued in the disclosure may not be limited to the above mentioned technical subjects, and other technical subjects which are not mentioned may be clearly understood, through the following descriptions, by those skilled in the art of the disclosure.

In accordance with an aspect of the disclosure, an electronic device includes: a communication interface; a memory; and at least one processor functionally connected to the communication interface and the memory, wherein the at least one processor is configured to receive information related to at least one first event generated for a predetermined first time from at least one external electronic device through the communication interface, acquire a first pattern and a first parameter related to the first pattern, based on information on at least one second event generated within at least one predetermined time interval among the information on the at least one first event, receive information related to at least one third event generated for a predetermined second time from the at least one external electronic device through the communication interface, acquire a second parameter related to the first pattern, based on the information related to the at least one third event, generate a first template, based on the first pattern, the first parameter, and the second parameter, and transmit information on the first template to a server through the communication interface.

In accordance with another aspect of the disclosure, a server includes: a communication interface; a memory; and at least one processor functionally connected to the communication interface and the memory, wherein the at least one processor is configured to receive information on a first template related to a first pattern from a plurality of external electronic devices through the communication interface, determine a predetermined time interval related to the first pattern and a value of a threshold parameter which satisfy a predetermined condition for the first template, and transmit the first pattern, the predetermined time interval, and the value of the threshold parameter to the plurality of external electronic devices through the communication interface.

In accordance with another aspect of the disclosure, an electronic device includes: a communication interface; a memory; and at least one processor functionally connected to the communication interface and the memory, wherein the at least one processor is configured to receive a first pattern, a predetermined time interval related to the first pattern, and a value of a threshold parameter related to the first pattern from a server through the communication interface, receive information related to at least one first event generated for a predetermined first time from at least one external electronic device through the communication interface, acquire a first parameter related to a second pattern corresponding to the first pattern, based on at least one second event generated within the predetermined time interval among the at least one first event, and provide the second pattern when the value of the first parameter is larger than or equal to the values of the threshold parameters.

A method of providing patterns and an electronic device for supporting the same according to various embodiments of the disclosure can provide (for example, recommend)

patterns which can be applied to a plurality of users on the basis of data related to patterns acquired from the plurality of users (for example, electronic devices of the plurality of users).

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
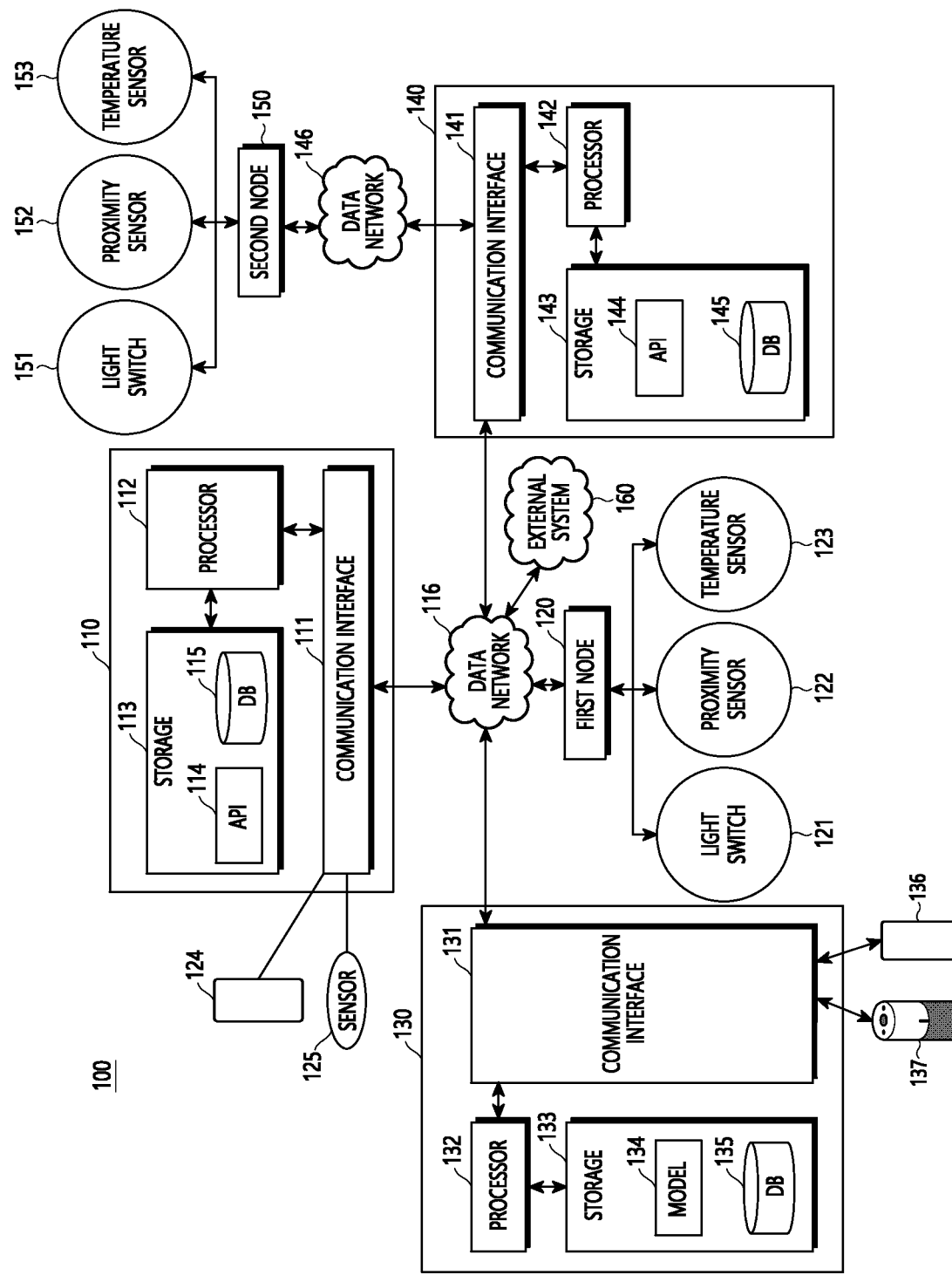
FIG. 1 illustrates an Internet of Things (IoT) system according to an embodiment.

FIG. 1 illustrates an Internet of Things (IoT) system 100 according to an embodiment.

Meanwhile, at least some of the elements in FIG. 1 may be omitted and elements which are not illustrated may be further included.

Referring to FIG. 1, the IoT system 100 according to an embodiment includes a plurality of electronic devices which can be connected to a data network 116 or 146. For example, the IoT system 100 may include at least one of a first IoT server 110, a first node 120, a voice assistance server 130, a second IoT server 140, a second node 150, or devices 121, 122, 123, 124, 125, 136, 137, 151, 152, and 153.

According to an embodiment, the first IoT server 110 may include at least one of a communication interface 111, a processor 112, or a storage unit 113. The second IoT server 140 may include at least one of a communication interface 141, a processor 142, or a storage unit 143. The "IoT server" in this document may remotely control and/or monitor one or more devices (for example, the devices 122, 123, 124, 125, 151, 152, and 153) through a relay device (for example, the first node 120 or the second node 150) or directly without any relay device on the basis of, for example, a data network (for example, the data network 116 or the data network 146). The "device" is a sensor, a home appliance, an electronic device for an office, or a device for performing a process disposed (or located) within a local environment such as, for example, a house, an office, a factory, a building, an outside point, or another type of site, and the device type has no limitation. A device for receiving a control command and performing an operation corresponding to the control command may be named a "target device". The IoT server may be named a central server in that the IoT server selects a target device from among a plurality of devices and provides a control command.

According to an embodiment, the first IoT server 110 may communicate with the devices 121, 122, and 123 through the data network 116. The data network 116 may refer to a network for long-range communication, such as, for example, the Internet or a computer network (for example, LAN or WAN) or may include a cellular network.

According to an embodiment, the first IoT server 110 may be connected to the data network 116 through the communication interface 111. The communication interface 111 may include a communication device (or a communication module) for supporting communication of the data network 116, and may be integrated into one element (for example, a single chip) or implemented as a plurality of separate elements (for example, a plurality of chips). The first IoT server 110 may communicate with the devices 121, 122, and 123 through the first node 120. The first node 120 may receive data from the first IoT server 110 through the data network 116 and transmit the received data to at least some of the devices 121, 122, and 123. Alternatively, the first node 120 may receive data from at least some of the devices 121, 122, and 123 and transmit the received data to the first IoT server 110 through the data network 116. The first node 120 may function as a bridge between the data network 116 and the devices 121, 122, and 123. Meanwhile, although FIG. 1 illustrates that there is one first node 120, this is only an example and the number of first nodes has no limitation.

The "node" in this document may be an edge computing system or a hub device. According to an embodiment, the first node 120 may support wired communication and/or wireless communication of the data network 116 and also support wired communication and/or wireless communication with the devices 121, 122, and 123. For example, the first node 120 may be connected to the devices 121, 122, and 123 through a short-range communication network such as at least one of Bluetooth, Wi-Fi, Wi-Fi direct, Z-wave, Zig-bee, INSETEON, X10, or Infrared Data Association (IrDA), but the communication type has no limitation. The first node 120 may be disposed (or located) within the same environment as, for example, a house, an office, a factory, a building, an outside point, or another type of site. Accordingly, the devices 121, 122, and 123 may be monitored and/or controlled by a service provided by the first IoT server 110, and may not be required to be capable of complete network communication (for example, Internet communication) for direct connection to the first IoT server 110. Although it is illustrated that the devices 121, 122, and 123 are implemented as electronic devices within a house, such as, for example, a light switch, a proximity sensor, a temperature sensor, or the like, they are only examples and have no limitation.

According to an embodiment, the first IoT server 110 may support direct communication with the devices 124 and 125. The "direct communication" is communication that does not pass through a relay device, such as, for example, the first node 120, and may be communication through, for example, a cellular communication network and/or a data network.

According to an embodiment, the first IoT server 110 may transmit a control command to at least some of the devices 121, 122, 123, 124, and 125. The "control command" may be data that causes a device which can be controlled to perform a specific operation, and the specific operation is an operation performed by the device and may include outputting information, sensing information, reporting information, and managing (for example, deleting or creating) information, but the operation type has no limitation. For example, the processor 112 may acquire information (or a request) for generating a control command from the outside (for example, at least some of the voice assistant server 130, the second IoT server 140, an external system 160, or the devices 121, 122, 123, 124, and 125) and generate the control command on the basis of the acquired information. Alternatively, the processor 112 may generate the control command when a monitoring result of at least some of the devices 121, 122, 123, 124, and 125 satisfy a predetermined condition. The processor 112 may control the communication interface 111 to transmit the control command to a target device.

According to an embodiment, the processor 112, the processor 132, or the processor 142 may be implemented by a combination of one or more of a general purpose processor, such as a Central Processing Unit (CPU), a Digital Signal Processor (DSP), an Application Processor (AP), a Communication Processor (CP), or the like, a graphic-dedicated processor, such as a Graphical Processing Unit (GPU) or a Vision Processing Unit (VPU), or an artificial intelligence-dedicated processor, such as a Neural Processing Unit (NPU). The processing units are only examples, and the processor 112 has no limitation as long as the processor 112 is, for example, an operation means capable of executing instructions stored in the storage unit 113 and outputting an executed result.

According to an embodiment, the processor 112 may configure a web-based interface on the basis of the API 114 or expose resources managed by the first IoT server 110 to the outside. The web-based interface may support, for example, communication between the first IoT server 110 and an external web service. The processor 112 may allow, for example, the external system 160 to control and/or access the devices 121, 122, and 123. The external system 160 may be, for example, a system which is irrelevant to the IoT system 100 or an independent system which is not a portion thereof. The external system 160 may be, for example, an external server or a website. However, security for access to resources of the devices 121, 122, and 123 or the first IoT server 110 from the external system 160 is needed. According to an embodiment, the processor 112 may expose an API end point (for example, a Universal Resource Locator (URL)) based on the API 114 to the outside through an automation application. According to the above description, the first IoT server 110 may transfer the control command to a target device among the devices 121, 122, and 123. Meanwhile, the description of the communication interface 141 and the processor 142 of the second IoT server 140, and the API 144 and the database 145 of the storage unit 143 may be substantially the same as the description of the communication interface 111 and the processor 112 of the first IoT server 110, and the API 114 and the database 115 of the storage unit 113. The description of the second node 150 may be substantially the same as the description of the first node 120. The second IoT server 140 may transfer the control command to a target device among the devices 151, 152, and 153. The first IoT server 110 and the second IoT server 140 may be operated by the same service provider in one embodiment, but may be operated by different service providers in another embodiment.

According to an embodiment, the voice assistant server 130 may transmit and receive data to and from the first IoT server 110 through the data network 116. The voice assistant server 130 according to an embodiment may include at least one of the communication interface 131, the processor 132, or the storage unit 133. The communication interface 131 may communicate with a smart phone 136 or an AI speaker 137 through a data network (not shown) and/or a cellular network (not shown). The smart phone 136 or the AI speaker 137 may include a microphone, and may acquire a user voice, convert the user voice into a voice signal, and transmit the voice signal to the voice assistant server 130. The processor 132 may receive the voice signal from the smart phone 136 or the AI speaker 137 through the communication interface 131. The processor 132 may process the received voice signal on the basis of a stored model 134. The processor 132 may generate (or identify) a control command using a processing result on the basis of information stored in the data base 135. According to an embodiment, the storage unit 113, 133, or 143 may include at least one type of non-transitory storage medium among a flash memory type, a hard disk type, a multimedia card micro type, a card type memory (for example, an SD memory, an XD memory, or the like), a Random Access Memory (RAM), a Static RAM (SRAM), a Read-Only Memory (ROM), an Electrically Erasable Programmable ROM (EEPROM), a Programmable Read-Only Memory (PROM), a magnetic memory, a magnetic disk, and an optical disk, and the type thereof has no limitation.

Figure 2:
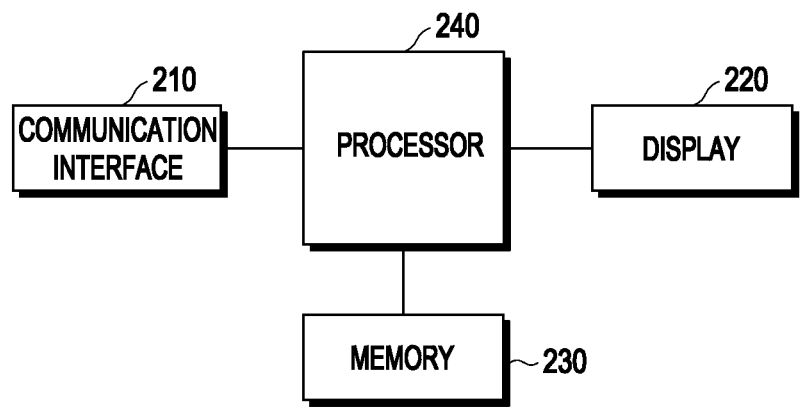
FIG. 2 is a block diagram illustrating an electronic device according to various embodiments.

FIG. 2 is a block diagram illustrating an electronic device 200 according to various embodiments.

Referring to FIG. 2, in an embodiment, the electronic device 200 may be an electronic device capable of performing at least some of the operations providing patterns. In an embodiment, the electronic device 200 may be an electronic device having a computing capability for performing at least some of the operations providing patterns. For example, the electronic device 200 may be an electronic device including a processor 240 having a capability for performing at least some of the operations providing patterns, and a memory 230.

In an embodiment, the electronic device 200 may be an electronic device registered in a service providing patterns. For example, at least one electronic device (for example, at least some of the devices 121, 122, 123, 124, and 125 of FIG. 1) may be registered in a service providing patterns (or a service for integratively or individually managing (or controlling) at least one electronic device located within the home). The electronic device 200 may be designated as an electronic device capable of performing at least some of the operations providing patterns on the basis of a user input among the at least one registered electronic device.

In an embodiment, the electronic device 200 may be an electronic device which is communication-connected with at least one external electronic device located within the home and controls the operation of at least one external electronic device located within the home through the communication connection. For example, the electronic device 200 may be the first node 120 or the second node 150 of FIG. 1.

In an embodiment, the electronic device 200 may be a server (for example, a cloud server) providing a service providing patterns and an edge computing device capable of performing distributed processing on the operation providing patterns.

In an embodiment, the electronic device 200 may include a communication interface 210, a display 220, a memory 230, and a processor 240.

In an embodiment, the communication interface 210 may communication-connect the electronic device 200 with at least one external electronic device and a server 300 providing a service providing patterns (hereinafter, referred to as a "server").

In an embodiment, the communication interface 210 may communication-connect the electronic device 200 with at least one external electronic device wirelessly or wiredly. The communication interface 210 may receive information on an event occurring in at least one external electronic device from at least one external electronic device communication-connected with the electronic device 200.

In an embodiment, the communication interface 210 may receive information on a state within the home (or a change in a state within the home) from a sensor communication-connected with the electronic device 200. For example, the communication interface 210 may receive, from a presence detection sensor communication-connected with the electronic device 200, information indicating entry of a user into the home from outside of the home. In another example, the communication interface 210 may receive information on a current temperature within the home (or a change in temperature) from a temperature sensor communication-connected with electronic device 200. However, the information on the state within the home received by the communication interface 210 from the sensor communication-connected with the electronic device 200 is not limited to the above-described example.

In an embodiment, the communication interface 210 may receive information on an operation of at least one external electronic device (or a change in the operation of at least one external electronic device) from at least one external electronic device communication-connected with the electronic device 200. For example, the communication interface 210 may receive information indicating turning on (or turning off) of a TV from the TV communication-connected with the electronic device 200. However, the information on the operation of at least one external electronic device received by the communication interface 210 from at least one external electronic device communication-connected with the electronic device 200 is not limited to the above-described example In an embodiment, information related to an event received by the communication interface 210 from at least one external electronic device communication-connected with the electronic device 200 may include information on a time at which the event is generated in at least one external electronic device as well as the information related to the event (for example, information on the state within the home or information on the operation of at least one external electronic device). For example, the information on the event may include information indicating turning on of the TV communication-connected with the electronic device 200 and also information on a time at which the TV is turned on.

In an embodiment, the communication interface 210 may communication-connect the electronic device 200 with a server. For example, the communication interface 210 may transmit a template related to patterns described below to the server 300. The communication interface 210 may receive information including a threshold parameter related to patterns described below from the server 300.

In an embodiment, the display 220 may visually provide information to the outside (for example, user) of the electronic device 200. The display 220 may include, for example, a display, a hologram device, or a projector, and a control circuit for controlling the corresponding device. In an embodiment, the display 220 may include a touch sensor configured to detect a touch or a pressure sensor configured to measure a strength of power applied by the touch.

In an embodiment, the display 220 may provide information related to patterns. For example, the display 220 may display information for allowing the user to select whether to configure patterns provided (for example, recommended) by the electronic device 200. However, the information which can be provided by the display 220 is not limited to the above-described example.

In an embodiment, the memory 230 may store various pieces of data used by at least one element (for example, the processor 240) of the electronic device 200. The data may include, for example, software (for example, program) and input data or output data for a command related thereto. The memory 230 may include volatile memory or non-volatile memory.

In an embodiment, the memory 230 may store information acquired while at least a portion of the operation for providing patterns is performed.

In an embodiment, the processor 240 may control at least one other element (for example, hardware or software element) of the electronic device 200 connected to the processor 240 by executing, for example, software (for example, program) and perform various data processing or calculations. In an embodiment, as at least a portion of the data processing or calculations, the processor 240 may store a command or data received from another element (for example, the communication interface 210) in a volatile memory, process the command or data stored in the volatile memory, and store resultant data in a non-volatile memory.

In an embodiment, the processor 240 may include a main processor (for example, a central processing unit or an application processor) or an auxiliary processor (for example, a graphic processing unit, a Neural Processing Unit (NPU), an image signal processor, a sensor hub processor, or a communication processor) which may operate independently from the main processor or together with the main processor.

According to an embodiment, the auxiliary processor (for example, NPU) may include a hardware structure specialized in processing of an artificial intelligence model. The intelligence model may be generated through machine learning. The learning may be performed by, for example, the electronic device 200 itself in which artificial intelligence is performed, or may be performed through a separate server (for example, the server). A learning algorithm may include, for example, supervised learning, unsupervised learning, semi-supervised learning, or reinforcement learning, but is not limited thereto. The artificial intelligence model may include a plurality of artificial neural network layers. The artificial neural network may be one of a Deep Neural Network (DNN), a Convolutional Neural Network (CNN), a Recurrent Neural Network (RNN), a Restricted Boltzmann Machine (BBM), a Deep Belief Network (DBN), a Bidirectional Recurrent Deep Neural Network (BRDNN), deep Q-networks, or a combination of two or more thereof, but is not limited thereto. The artificial intelligence model may additionally or alternatively include a software structure as well as a hardware structure.

In an embodiment, the processor 240 may perform at least a portion of the operation for providing patterns. The portion of the operation for providing the pattern by the processor 240 is described below in detail with reference to FIGS. 4 to 8.

In an embodiment, FIG. 2 illustrates that the electronic device 200 includes the communication interface 210, the display 220, the memory 230, and the processor 240, but is not limited thereto. For example, the electronic device 200 may not include some of the elements illustrated in FIG. 2 (for example, the display 220), and may further include an element which is not illustrated in FIG. 2 (for example, a sensor for detecting a state within the home).

Figure 3:
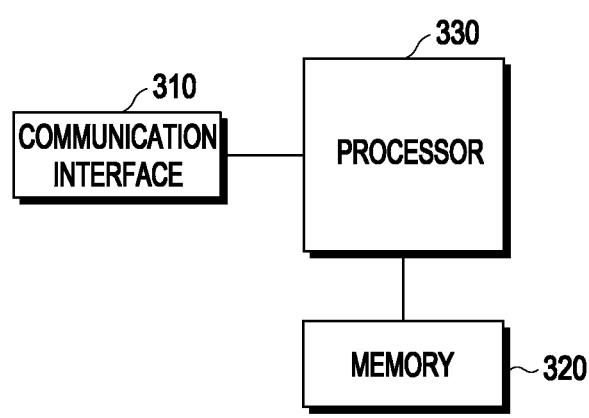
FIG. 3 is a block diagram illustrating a server according to various embodiments.

FIG. 3 is a block diagram illustrating a server 300 according to various embodiments.

Referring to FIG. 3, in an embodiment, the server 300 may be a server which can provide a service for providing patterns.

In an embodiment, the server 300 may be included the first IoT server 110, the voice assistant server 130, or the second IoT server 140 of FIG. 1. In an embodiment, the server 300 may be a server independent from the first IoT server 110, the voice assistant server 130, and the second IoT server 140 of FIG. 1.

In an embodiment, the server 300 may include a communication interface 310, a memory 320, and a processor 330.

In an embodiment, the communication interface 310 may communication-connect the server 300 with a plurality of external electronic devices. For example, the communication interface 310 may communication-connect the server 300 with a plurality of external electronic devices through at least one of various communication schemes.

In an embodiment, the communication interface 310 may receive templates related to patterns from a plurality of external electronic devices registered in a service for providing patterns. In an embodiment, the communication interface 310 may transmit information including threshold parameters related to patterns to the plurality of external electronic devices.

In an embodiment, the memory 320 may store various pieces of data used by at least one element (for example, the processor 330) of the server 300.

In an embodiment, the memory 320 may store information acquired while at least a portion of the operation for providing patterns is performed.

In an embodiment, the processor 330 may perform at least a portion of the operation for providing patterns. In an embodiment, the processor 330 may determine threshold parameters related to patterns on the basis of templates related to patterns received from a plurality of external electronic devices. For example, the processor 330 may determine parameters related to patterns on the basis of templates related to patterns received from a plurality of external electronic devices through an artificial neural network. In another example, the processor 330 may determine parameters related to patterns on the basis of templates related to patterns received from a plurality of external electronic devices through a predetermined algorithm. A method by which the processor 330 determines parameters related to patterns on the basis of templates related to patterns received from a plurality of external electronic devices is described below in detail.

FIG. 3 illustrates that the server 300 includes the communication interface 310, the memory 320, and the processor 330, but is not limited thereto, and the server 300 may further include various elements (for example, an input device and a display).

Figure 4:
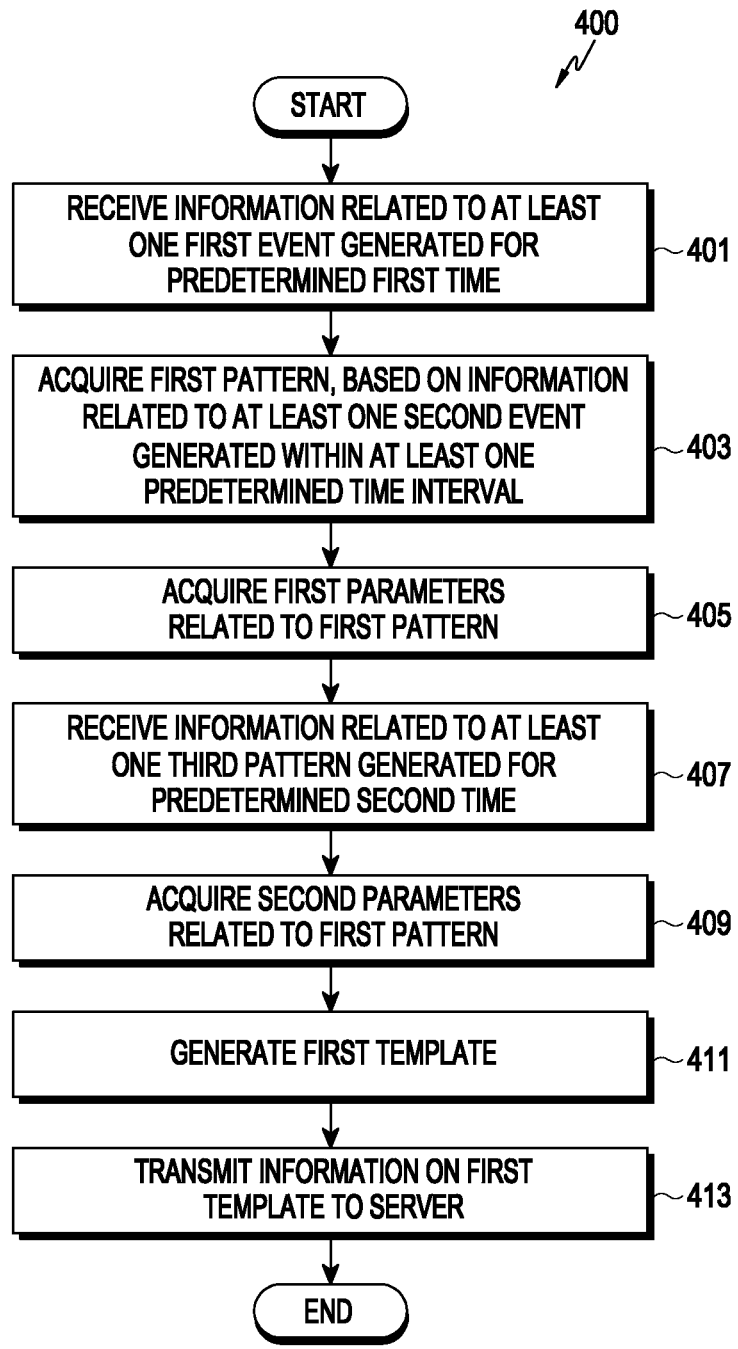
FIG. 4 is a flowchart illustrating a method by which an electronic device provides a template according to various embodiments.

FIG. 4 is a flowchart 400 illustrating a method by which the electronic device 200 provides templates according to various embodiments.

Referring to FIG. 4, in operation 401, the processor 240 may receive information related to at least one first event generated for a predetermined first time from at least one external electronic device through the communication interface 210 in an embodiment.

In an embodiment, the electronic device 200 and at least one external electronic device may be electronic devices registered in the service providing patterns. For example, the electronic device 200 and at least one external electronic device may be electronic devices registered in the service providing patterns (or service for integratively or individually managing (or controlling) at least one electronic device located within the home).

In an embodiment, the first time may be a predetermined time (or period) during which the electronic device 200 collects at least one first event generated by at least one external electronic device from at least one external electronic device. For example, the electronic device 200 may collect at least one first event generated by at least one external electronic device from at least one external electronic device through the communication interface 210 for two weeks.

In an embodiment, information on at least one first event may include at least one piece of information on a state within the home (or a change in the state within the home) received from at least one external electronic device (for example, sensor) communication-connected with the electronic device 200 and information on the operation of at least one external electronic device (or a change in the operation of at least one external electronic device) received from at least one external electronic device (for example, home appliances) communication-connected with the electronic device 200.

In an embodiment, information on at least one first event may include at least one of a unique identifier of at least one external electronic device (hereinafter, interchangeable with a "device identity (ID)"), a type of at least one external electronic device, a capability (for example, function) of at least one external electronic device, or a value of the capability (for example, value indicating the state or operation according to the function).

In an embodiment, information on at least one first event may include information on a time at which the event is generated by at least one external electronic device as well as the information related to the event (for example, information on the state within the home or information on the operation of at least one external electronic device).

In an embodiment, the processor 240 may generate (allocate or assign) an identifier (hereinafter, referred to as a "first identifier") to the information on at least one first event after receiving the information on at least one first event.

In an embodiment, the first identifier may be an identifier that can be generated for at least one electronic device within the home (for example, the electronic device 200 and at least one external electronic device). In an embodiment, the first identifier may be the encoded code form. In an embodiment, the first identifier may be generated as the same value for at least one electronic device within the home.

In an embodiment, the first identifier may be an identifier used to integratively register at least one electronic device within the home in order to receive the service providing patterns. In an embodiment, the first identifier may be an identifier generated on the basis of (or corresponding to) the identifier used to integratively register at least one electronic device within the home in order to receive the service providing patterns. In an embodiment, the first identifier may be an identifier used to group and manage at least one electronic device within the home. In an embodiment, the first identifier may be an identifier generated on the basis of the identifier used to group and manage at least one electronic device within the home. In an embodiment, the first identifier may be an account of a user of the electronic device 200 used to group and mange at least one electronic device within the home. In an embodiment, the first identifier may be an identifier generated on the basis of the account of the user of the electronic device 200 used to group and mange at least one electronic device within the home.

In an embodiment, [Table 1] below may show information on at least one first event and the first identifier.

TABLE 1

| Time at which event is generated | Device type | Device ID | Capability | Capability value | First identifier |
|---|---|---|---|---|---|
| 2020-07-21 16:01 | Sensor (for example, presence detection sensor) | xxx0 | presence (presence detection) | present (presence is detected) | A |
| 2020-07-21 16:12 | TV (television) | xxx1 | Switch (power of TV) | on (power of TV is turned on) | A |
| 2020-07-21 16:13 | TV | xxx1 | tvChannel (channel of TV) | 11 (channel number of TV) | A |
| 2020-07-21 16:28 | AC (air conditioner) | xxx2 | Switch (power of air conditioner) | on (power of air condition is turned on) | A |

In an embodiment, the time at which the event is generated may indicate a time at which the event is generated by at least one external electronic device in [Table 1]. For example, "2020-07-21 16:01" may indicate a time at which entry of the user (or electronic device of the user) into the home from the outside is detected by the presence detection sensor, that is, 16:01 on Jul. 21, 2020. In another example, "2020-07-21 16:12" may indicate a time at which power of the TV is turned on, that is, 16:12 on Jul. 21, 2020. In another example, "2020-07-21 16:13" may indicate a time at which a channel of the TV becomes a channel number "11" (or changed to "11"), that is, 16:13 on Jul. 21, 2020. In another example, "2020-07-21 16:28" may indicate a time at which power of the air conditioner is turned on, that is, 16:28 on Jul. 21, 2020.

In an embodiment, as shown in [Table 1], the processor 240 may generate the same first identifier (for example, "A") for at least one electronic device (for example, the presence detection sensor, the TV, and the air conditioner) within the home.

In an embodiment, the processor 240 may change the information on at least one first event and the first identifier into data as shown in [Table 1].

In operation 403, the processor 240 may acquire a first pattern on the basis of information on at least one second event generated within at least one predetermined time interval among pieces of information on at least one event in an embodiment.

The operation in which the processor 240 acquires the first pattern is described in detail with reference to FIG. 5 below.

Figure 5:
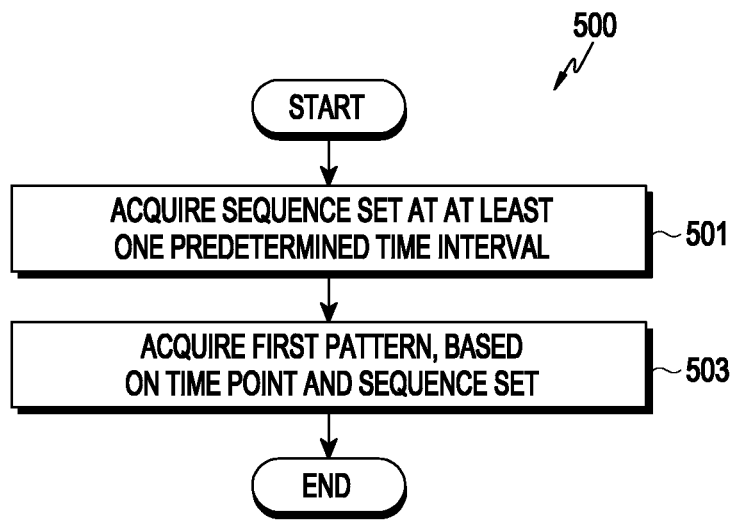
FIG. 5 is a flowchart illustrating a method of acquiring a first pattern according to various embodiments.

FIG. 5 is a flowchart 500 illustrating a method of acquiring the first pattern according to various embodiments.

Referring to FIG. 5, in operation 501, the processor 240 may acquire a sequence set related to a pattern (hereinafter, referred to as a "sequence set") at least one predetermined time intervals in an embodiment.

In an embodiment, the processor 240 may acquire a sequence set on the basis of an event generated within at least one predetermined time interval in every time interval of at least one predetermined time interval.

In an embodiment, [Table 2] below may show a sequence set acquired on the basis of [Table 1].

TABLE 2

| Time interval | Time point | Sequence set | First identifier |
|---|---|---|---|
| 5 minutes | 16:00 | {Sensor_xxx0_presence_present} | A |
|  | 16:10 | {TV_xxx1_switch_on, TV_xxx1_tvChannel_11} | A |
|  | 16:25 | {AC_xxx2_switch_on} | A |
| 15 minutes | 16:00 | {Sensor_xxx0_presence_present, TV_xxx1_switch_on, TV_xxx1_tvChannel_11} | A |
|  | 16:15 | {AC_xxx2_switch_on} | A |
| 30 minutes | 16:00 | {Sensor_xxx0_presence_present, TV_xxx1_switch_on, TV_xxx1_tvChannel_11, AC_xxx2_switch_on} | A |

In [Table 2], elements of the sequence set may indicate a device type, a device ID, a capability, and a capability value. For example, "Sensor_xxx0_presence_present" may indicate present detection sensor_presence detection sensor ID_capability of presence detection sensor_value of capability of presence detection sensor.

In an embodiment, the processor 240 may designate 5 minutes, 15 minutes, and 30 minutes as time intervals at which the sequence set is acquired as shown in [Table 2]. However, the time intervals at which the sequence set is acquired are not limited to 5 minutes, 15 minutes, and 30 minutes, and may be designated as various time intervals.

In an embodiment, the processor 240 may acquire a sequence set on the basis of at least one second event generated within a predetermined time interval (hereinafter, interchangeable with a "time interval") based on a time point (hereinafter, a time which is a reference of the predetermined time interval is referred to as a "time point") as shown in [Table 2]. For example, the processor 240 may acquire sequence sets (for example, {Sensor_xxx0_presence_present}, {TV_xxx1_switch_on, TV_xxx1_tvChannel_11}, and {AC_xxx2_switch_on}) including events generated within a predetermined time interval in every predetermined interval (for example, 5 minutes) based on time points (for example, 16:00, 16:10, and 16:25). In an embodiment, elements of the sequence set may be arranged according to the time at which the event is generated. For example, in the sequence set {Sensor_xxx0_presence_present, TV_xxx1_switch_on, TV_xxx1_tvChannel_11} corresponding to the time interval of 15 minutes and the time point of 16:00, the order of time at which events of elements are generated may be Sensor_xxx0_presence_present (time at which the event is generated: 16:01), TV_xxx1_switch_on (time at which the event is generated: 16:12), and TV_xxx1_tvChannel_11 (time at which the event is generated: 16:13).

In an embodiment, [Table 2] shows acquisition of the sequence set based on second events generated within a predetermined time interval (for example, 5 minutes) after a time point (for example, 16:00), but it is not limited thereto. For example, the processor 240 may acquire a sequence set on the basis of second events generated within a portion (for example, two and a half minutes) of the predetermined time interval (for example, 5 minutes) after the time point (for example, 16:00) (for example, time between 16:57:30 and 16:00) or generated within a portion (for example, two and a half minutes) of the predetermined time interval before the time point (for example, 16:00) (for example, time between 16:00 and 16:02:30).

In operation 503, the processor 240 may acquire a first pattern on the basis of the time and the sequence set in an embodiment.

In an embodiment, the first pattern may include a condition and an action (for example, a combination of the condition and the action). In an embodiment, the processor 240 may configure an event related to the operation of at least one external electronic device within the home included in the sequence set (hereinafter, referred to as an "operation-related event") as the action. In an embodiment, with respect to the configured action, the processor 240 may configure a condition on the basis of at least one of a time point corresponding to the sequence set, an event related to the state within the home (hereinafter, referred to as a "state-related event"), or an operation-related event other than the operation-related event configured as the action. For example, the processor 240 may configure the operation-related event of TV_xxx1_switch_on as the action on the basis of the time point (16:00) of the time interval of 15 minutes and the sequence set ({Sensor_xxx0_presence_present, TV_xxx1_switch_on, TV_xxx1_tvChannel_11}) in [Table 2]. With respect to the event TV_xxx1_switch_on configured as the action, the processor 240 may configure conditions (for example, condition (16:00), condition (Sensor_xxx0_presence_present), or condition (16:00 and Sensor_xxx0_presence_present) by combining the time point (16:00) and Sensor_xxx0_presence_present as an event generated earlier than the event configured as the action. With respect to the event TV_xxx1_tvChannel_11 configured as the action, the processor 240 may configure conditions (for example, condition (16:00), condition (Sensor_xxx0_presence_present), condition (TV_xxx1_switch_on), condition (16:00 and Sensor_xxx0_presence_present), condition (16:00 and TV_xxx1_switch_on), and condition (Sensor_xxx0_presence_present and TV_xxx1_switch_on) by combining the time point (16:00), Sensor_xxx0_presence_present, and TV_xxx1_switch_on.

In the above-described example, the processor 240 configures, as the condition, the event generated earlier than the event configured as the action by way of example, but it is not limited thereto. In an embodiment, the processor 240 may configure, as a condition of the configured action, an event generated later than the event configured as the action within a predetermined time (for example, within a time interval of about ⅙ of the predetermined time interval). For example, when TV_xxx1_switch_on is configured as the action and the event of TV_xxx1_tvChannel_11 is generated later than the event of TV_xxx1_switch_on within a predetermined time (for example, 1 minute included in a time interval corresponding to ⅙ of 5 minutes as a predetermined time), TV_xxx1_tvChannel_11 may be configured as the condition of TV_xxx1_switch_on.

In an embodiment, the first pattern of the predetermined time interval may refer to a condition of the first pattern and an action of the first pattern indicating the time point configured as the condition of the first pattern (or the time at which the event configured as the condition of the first pattern is generated) and indicating that the time at which the event configured as the action is generated is within a predetermined time interval. For example, a first pattern (condition (16:10) and action (TV_xxx1_switch_on)) of an interval of 15 minutes may refer to a condition of the first pattern (16:10) and an action of the first pattern (TV_xxx1_switch_on) indicating the time point (16:10) configured as the condition and indicating that the time at which power of the TV is turned on is within 15 minutes from the time point.

In an embodiment, [Table 3] and [Table 4] below may show information related to the acquired first pattern.

TABLE 3

| Date on which event is generated | Time interval | Condition | Action | First identifier |
|---|---|---|---|---|
| 2020 Jul. 21 | 5 minutes | 16:10 | TV_xxx1_switch_on | A |
| 2020 Jul. 21 | 15 minutes | 16:15 | TV_xxx1_switch_on | A |
| 2020 Jul. 21 | 30 minutes | 16:00 | TV_xxx1_switch_on | A |
| 2020 Jul. 21 | 5 minutes | 16:30 | AC_xxx2_switch_on | A |
| 2020 Jul. 21 | 15 minutes | 16:30 | AC_xxx2_switch_on | A |
| 2020 Jul. 21 | 30 minutes | 16:30 | AC_xxx2_switch_on | A |

TABLE 4

| Date on which event is generated | Time interval | Condition | Action | Same_device | Delay | First identifier |
|---|---|---|---|---|---|---|
| 2020 Jul. 21 | 5 minutes | 16:10 + TV_xxx1_switch_on | TV_xxx1_tvChannel_11 | 1 | 1 minute | A |
| 2020 Jul. 21 | 15 minutes | 16:15 + TV_xxx1_switch_on | TV_xxx1_tvChannel_11 | 1 | 1 minute | A |
| 2020 Jul. 21 | 30 minutes | 16:00 + TV_xxx1_switch_on | TV_xxx1_tvChannel_11 | 1 | 1 minute | A |
| 2020 Jul. 21 | 15 minutes | 16:00 + sensor_xxx0_present | TV_xxx1_switch_on | 0 | 11 minutes | A |
| 2020 Jul. 21 | 30 minutes | 16:00 + sensor_xxx0_present | TV_xxx1_switch_on | 0 | 11 minutes | A |
| 2020 Jul. 21 | 30 minutes | 16:00 + sensor_xxx0_present | AC_xxx2_switch_on | 0 | 27 minutes | A |
| 2020 Jul. 21 | 30 minutes | 16:00 + TV_xxx1_switch_on | AC_xxx2_switch_on | 0 | 16 minutes | A |

In [Table 4], for example, the condition "16:10+ TV_xxx1_on" may be a condition indicating that the time point is 16:10 and power of the TV is turned on.

In an embodiment, as shown in [Table 3] and [Table 4], the processor 240 may configure actions on the basis of the sequence set in every predetermined time interval and combine conditions for the configured actions, so as to acquire a first action.

In an embodiment, in [Table 4], "same_device" may indicate whether an external electronic device related to the condition and an external electronic device related to the action are the same electronic device. For example, "same_device" may be configured as "1" when the external electronic device related to the condition and the external electronic device related to the action are the same, and configured as "0" when the external electronic device related to the condition and the external electronic device related to the action are different.

In an embodiment, in [Table 4], "delay" may indicate a difference between the time at which the event configured as the condition is generated and the time at which the event configured as the action is generated. In an embodiment, "delay" may be configured when the condition is configured on the basis of the event (for example, the state-related event or the operation-related event). For example, when the condition is configured on the basis of the time point, "delay" may not be configured. In another example, when the condition is "16:10+TV_xxx1_switch_on" and the action is "TV_xxx1_tvChannel_11", a difference between the time point at which the operation-related event TV_xxx1_switch_on configured as the condition is generated and the time at which the operation-related event TV_xxx1_tvChannel_11 configured as the action is generated is 1 minute, and thus a delay may be configured as 1 minute.

Returning to FIG. 4, in operation 405, the processor 240 may acquire a first parameter related to the first pattern in an embodiment.

In an embodiment, the processor 240 may acquire the first parameter by analyzing the first pattern (or information related to the first pattern). In an embodiment, the first parameter may include at least one of support of an association rule, confidence, lift, or a Rule Power Factor (RPF). In an embodiment, the first parameter may include information (for example, n_all, n_x, n_y and n_ptns) required for calculating at least one of the support, the confidence, the lift, or the RPF as well as at least one of the support, the confidence, the lift, or the RPF.

In an embodiment, [Table 5] below may show information related to the first pattern and the first parameters acquired on the basis of information on the event obtained from at least one external electronic device for a predetermined first time (for example, 2 weeks).

TABLE 5

| First identifier | Time interval | Condition | Action | same_device |
|---|---|---|---|---|
| A | 5 minutes | 16:10 | TV_xxx1_switch_on | — |
| A | 15 minutes | 16:15 | TV_xxx1_switch_on | — |
| A | 30 minutes | 16:00 | TV_xxx1_switch_on | — |
| A | 5 minutes | 16:30 | AC_xxx2_switch_on | — |
| A | 15 minutes | 16:30 | AC_xxx2_switch_on | — |
| A | 30 minutes | 16:30 | AC_xxx2_switch_on | — |
| A | 5 minutes | 16:10 + TV_xxx1_on | TV_xxx1_tvChannel_11 | 1 |
| A | 15 minutes | 16:15 + TV_xxx1_on | TV_xxx1_tvChannel_11 | 1 |
| A | 30 minutes | 16:00 + TV_xxx1_on | TV_xxx1_tvChannel_11 | 1 |
| A | 15 minutes | 16:00 + sensor_xxx0_present | TV_xxx1_switch_on | 0 |
| A | 30 minutes | 16:00 + sensor_xxxx0_present | TV_xxx1_switch_on | 0 |
| A | 30 minutes | 16:00 + sensor_xxx0_present | AC_xxx2_switch_on | 0 |
| A | 30 minutes | 16:00 + TV_xxx1_on | AC_xxx2_switch_on | 0 |
| A | 15 minutes | sensor_xxx0_present | TV_xxx1_switch_on | 0 |
| A | 30 minutes | sensor_xxx0_present | TV_xxx1_switch_on | 0 |
| A | 30 minutes | sensor_xxx0_present | AC_xxx2_switch_on | 0 |
| A | 30 minutes | TV_xxx1_on | AC_xxx2_switch_on | 0 |

| First identifier | delay | n_all | n_x | n_y | n_ptns | confidence | lift | RPF |
|---|---|---|---|---|---|---|---|---|
| A | — | 4032 | 14 | 40 | 9 | 0.64 | 64.8 | 41.66 |
| A | — | 1344 | 14 | 38 | 9 | 0.64 | 22.7 | 14.62 |
| A | — | 672 | 14 | 35 | 10 | 0.71 | 13.7 | 9.80 |
| A | — | 4032 | 14 | 30 | 3 | 0.21 | 28.8 | 6.17 |
| A | — | 1344 | 14 | 27 | 4 | 0.29 | 14.2 | 4.06 |
| A | — | 672 | 14 | 24 | 8 | 0.57 | 16.0 | 9.14 |
| A | 2 minutes | 4032 | 9 | 50 | 3 | 0.33 | 26.9 | 8.96 |
| A | 2 minutes | 1344 | 9 | 40 | 3 | 0.33 | 11.2 | 3.73 |
| A | 3 minutes | 672 | 10 | 35 | 3 | 0.30 | 5.8 | 1.73 |
| A | 7 minutes | 1344 | 7 | 38 | 6 | 0.86 | 30.3 | 25.98 |
| A | 9 minutes | 672 | 10 | 35 | 8 | 0.80 | 15.4 | 12.29 |
| A | 20 minutes | 672 | 10 | 27 | 3 | 0.30 | 7.5 | 2.24 |
| A | 10 minutes | 672 | 10 | 24 | 7 | 0.70 | 19.6 | 13.72 |
| A | 7 minutes | 1344 | 22 | 38 | 14 | 0.64 | 22.5 | 14.32 |
| A | 10 minutes | 672 | 20 | 35 | 17 | 0.85 | 16.3 | 13.87 |
| A | 20 minutes | 672 | 20 | 24 | 10 | 0.50 | 14.0 | 7.00 |
| A | 10 minutes | 672 | 38 | 24 | 15 | 0.39 | 11.1 | 4.36 |

In [Table 5], "n_all" may be a value obtained by dividing a predetermined first time (for example, 2 weeks) by a predetermined time interval. For example, when the predetermined first time is 2 weeks and the predetermined time interval is 5 minutes, n_all may be 4023 (=2 (2 weeks)*7 (7 days)*24 (24 hours)*12 (the number of 5 minute units within 1 hour)).

In [Table 5], "n_x" may indicate a time point corresponding to the condition or the number of predetermined time intervals at which the event is generated for the predetermined first time (for example, 2 weeks). For example, when the condition is 16:10, the number of predetermined time intervals (for example, 5 minutes) including 16:10 for 2 weeks may be 14.

In [Table 5], "n_y" may indicate the number of predetermined time intervals at which the action (or event corresponding to the action) is generated for the predetermined first time (for example, 2 weeks). For example, when the action is TV_xxx1_switch_on, the number of predetermined time intervals (for example, 5 minutes) at which power of the TV is turned on for 2 weeks may be 40. Although not illustrated in [Table 5], if the event configured as the same action is generated several times within a predetermined time interval, the processor 240 may determine that the same action is generated once within the predetermined time interval. For example, when the same action TV_xxx1_switch_on is generated two times within the predetermined time interval of 5 minutes, the processor 240 may determine that the action TV_xxx1_switch_on is generated once by calculating n_y.

In [Table 5], "n_ptns" may indicate the number of predetermined time intervals at which the condition and the action are generated together during a predetermined time interval for a predetermined first time (for example, 2 weeks). For example, when the predetermined first time is 2 weeks, the time interval is 5 minutes, the condition is 16:10, and the action is TV_xxx1_switch_on, the number of time intervals of 5 minutes at which TV_xxx1_switch_on is generated within 5 minutes from 16:10 for 2 weeks may be 9.

In [Table 5], the confidence may be a value obtained by dividing n_ptns by n_x.

In [Table 5], the lift may be acquired by performing calculation of confidence r n_y*n_all.

In [Table 5], the RPF may be acquired by multiplying the confidence and the lift.

In an embodiment, although [Table 5] does not show the support, the support may be acquired by dividing n_ptns by n_ptns.

However, the first parameter related to the first pattern is not limited to the parameters shown through [Table 5].

In operation 407, the processor 240 may receive information on at least one third event generated by at least one external electronic device for a predetermined second time from at least one external electronic device through the communication interface 210 in an embodiment.

In an embodiment, the predetermined second time is a time after the predetermined first time in operation 401 passes, and may be the same as the predetermined first time (or the size of the predetermined first time) (for example, 2 weeks that are the same as the predetermined first time after 2 weeks that are the predetermined first time pass) or different from the predetermined first time (for example, 1 week that is different from the predetermined first time after 2 weeks that are the predetermined first time pass).

In operation 409, in an embodiment, the processor 240 may acquire second parameters related to the first pattern on the basis of information related to at least one third event.

In an embodiment, the processor 240 may acquire a pattern (for example, a combination of a condition and an action which are the same as the condition and the action of the first pattern) which is the same as the first pattern on the basis of the information related to at least one third event. Since examples of a method by which the processor 240 acquires the pattern which is the same as the first pattern on the basis of the information related to at least one third event are at least partially the same as or similar to the examples and the predetermined first time. For example, when the predetermined first time is 2 weeks and the predetermined second time is 1 week, the processor 240 may acquire parameters on the basis of the third event acquired from at least one external electronic device for 1 week. When n_all is 2016, n_x is 5, n_y is 25, and n_ptns is 2 as portions of the acquired parameters, the processor 240 may control n_all, n_x, n_y, and n_ptns to be 4032, 10, 50, and 4 by multiplying n_all, n_x, n_y, and n_ptns by 2 (a value obtained by dividing the predetermined first time by the predetermined second time). The processor 240 may acquire second parameters by calculating confidence, lift, or RPF on the basis of the controlled n_all, n_x, n_y, and n_ptns.

In an embodiment, [Table 6] below may show some of [Table 5] and the confidence (y_confidence) (hereinafter, referred to as "confidence for verification) as the second parameter.

TABLE 6

| First identifier | Time interval | Condition | Action | same_device | delay |
|---|---|---|---|---|---|
| A | 5 minutes | 16:10 + TV_xxx1_switch_on | TV_xxx1_tvChannel_11 | 1 | 2 minutes |
| A | 15 minutes | 16:15 + TV_xxx1_switch_on | TV_xxx1_tvChannel_11 | 1 | 2 minutes |
| A | 30 minutes | 16:00 + TV_xxx1_switch_on | TV_xxx1_tvChannel_11 | 1 | 3 minutes |
| A | 15 minutes | 16:00 + sensor_xxx0_present | TV_xxx1_switch_on | 0 | 7 minutes |
| A | 30 minutes | 16:00 + sensor_xxx0_present | TV_xxx1_switch_on | 0 | 9 minutes |
| A | 30 minutes | 16:00 + sensor_xxx0_present | AC_xxx2_switch_on | 0 | 20 minutes |

| First identifier | n_all | n_x | n_y | n_ptns | confidence | lift | RPF | y_confidence |
|---|---|---|---|---|---|---|---|---|
| A | 4032 | 9 | 50 | 3 | 0.33 | 26.9 | 8.96 | 0.4 |
| A | 1344 | 9 | 40 | 3 | 0.33 | 11.2 | 3.73 | 0.35 |
| A | 672 | 10 | 35 | 3 | 0.30 | 5.8 | 1.73 | 0.38 |
| A | 1344 | 7 | 38 | 6 | 0.86 | 30.3 | 25.98 | 0.7 |
| A | 672 | 10 | 35 | 8 | 0.80 | 15.4 | 12.29 | 0.75 |
| A | 672 | 10 | 27 | 3 | 0.30 | 7.5 | 2.24 | 0.6 | of the operation in which the first pattern is acquired in operation 403, a detailed description thereof is omitted.

In an embodiment, the processor 240 may acquire second parameters on the basis of the pattern, which is the same as the first pattern, acquired on the basis of the information related to at least one third event.

In an embodiment, when the predetermined second time (for example, the size of the predetermined second time) and the predetermined first time are the same as each other, the examples of the method by which the processor 240 acquires the pattern, which is the same as the first pattern, acquired on the basis of the information related to at least one third event are at least partially the same as or similar to the examples of the operation in which the first parameters are acquired in operation 405, so a detailed description thereof is omitted.

In an embodiment, when the predetermined second time (for example, the size of the predetermined second time) and the predetermined first time are different from each other, the processor 240 may acquire parameters on the basis of the pattern which is the same as the first pattern and acquire second parameters by controlling the acquired parameters on the basis of a ratio between the predetermined second time

[Table 6] shows the confidence for verification (y_confidence) as the second parameter, but is not limited thereto, and the second parameter may include various parameters which can be acquired on the basis of the pattern which is the same as the first pattern.

[Table 6] includes only some of [Table 5], but is not limited thereto, and second parameters for all of [Table 5] may be acquired.

In operation 411, the processor 240 may generate a first template on the basis of the first pattern, the first parameters, and the second parameters in an embodiment.

In an embodiment, the processor 240 may generate the first template by deleting specific information from the condition and the action of the first pattern. For example, the processor 240 may generate the first template by leaving the specific information on the condition and the action of the first pattern blank. Hereinafter, the first pattern obtained by deleting the specific information from the condition and the action of the first pattern is referred to as a "second pattern".

In an embodiment, [Table 7] below may show templates generated on the basis of [Table 6].

TABLE 7

| First identifier | Time interval | Condition | Action | same_device | delay |
|---|---|---|---|---|---|
| A | 5 minutes | ?:? + TV_?_switch_? | TV_?_tvChannel_? | 1 | 2 minutes |
| A | 15 minutes | ?:? + TV_?_switch_on | TV_?_tvChannel_? | 1 | 2 minutes |
| A | 30 minutes | ?:? + TV_?_switch_on | TV_?_tvChannel_? | 1 | 3 minutes |
| A | 15 minutes | ?:? + sensor_?_present | TV_?_switch_on | 0 | 7 minutes |
| A | 30 minutes | ?:? + sensor_?_present | TV_?_switch_on | 0 | 9 minutes |
| A | 30 minutes | ?:? + sensor_?_present | AC_?_switch_on | 0 | 20 minutes |

| First identifier | n_all | n_x | n_y | n_ptns | confidence | lift | RPF | y_confidence |
|---|---|---|---|---|---|---|---|---|
| A | 4032 | 9 | 50 | 3 | 0.33 | 26.9 | 8.96 | 0.4 |
| A | 1344 | 9 | 40 | 3 | 0.33 | 11.2 | 3.73 | 0.35 |
| A | 672 | 10 | 35 | 3 | 0.30 | 5.8 | 1.73 | 0.38 |
| A | 1344 | 7 | 38 | 6 | 0.86 | 30.3 | 25.98 | 0.7 |
| A | 672 | 10 | 35 | 8 | 0.80 | 15.4 | 12.29 | 0.75 |
| A | 672 | 10 | 27 | 3 | 0.30 | 7.5 | 2.24 | 0.6 |

As shown in [Table 7], the processor 240 may delete a specific time, a device ID, and a specific channel number of the TV from the condition and the action in an embodiment. In an embodiment, [Table 7] illustrates that turning on of power of the TV is not deleted, but a value of a capability of the external electronic device, such as turning on of power of the TV, may be deleted. For example, in the case of power of the TV, when the number (for example, 2) of available values of the capability, such as on or off, is smaller than a predetermined number, the processor 240 may not delete the value of the capability of the external electronic device. In another example, when the number of values of the capability, such as a specific channel number of the TV or temperature within the home, is larger than or equal to a predetermined number, the processor 240 may delete the value of the capability of the external electronic device.

In an embodiment, the template may refer to information including the second pattern (for example, the second pattern having the same condition and action), first parameters related to the second pattern, and second parameters related to the second pattern. For example, [Table 7] may show two templates related to a pattern (?:?+TV_?_switch_? and TV_?_tvChannel_?) and a pattern (?:?+sensor_?_present and TV_?_switch_on).

In operation 413, the processor 240 may transmit information on a first template to the server 300 through the communication interface 210 in an embodiment. For example, the processor 240 may transmit the information on the first template to the server 300 for providing the service providing patterns through the communication interface 210. In an embodiment, the information on the first template may include the first template and a first identifier.

FIG. 4 illustrates the case in which the electronic device 200 is an electronic device having a computing capability to perform at least some of the operations providing patterns. When the electronic device 200 is not the electronic device having the computing capability to perform at least some of the operations providing patterns (for example, when all electronic devices registered in the service providing patterns do not have the computing capability to perform at least some of the operations providing patterns) in an embodiment, the examples illustrated in FIG. 4 may be performed by the server 300.

Figure 6:
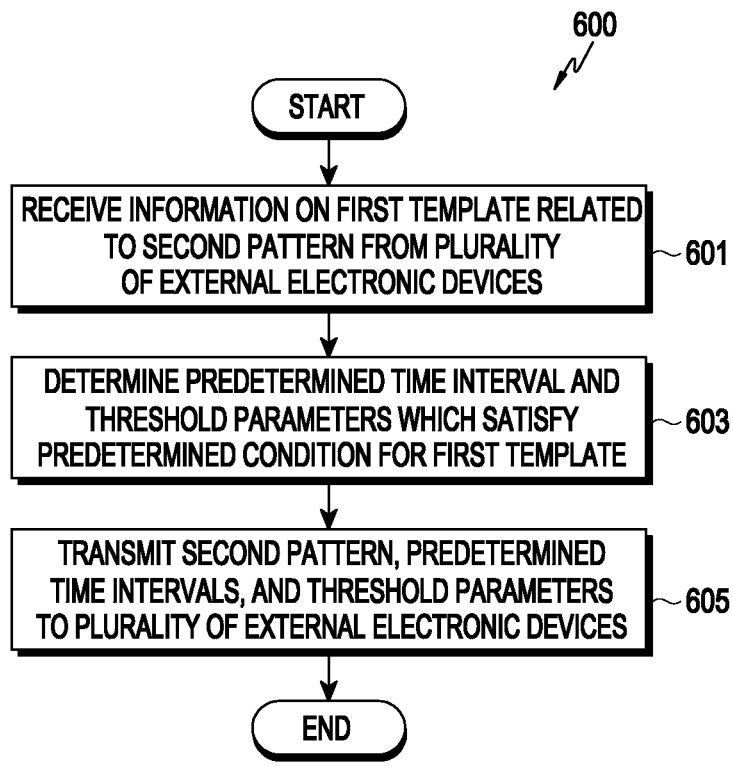
FIG. 6 is a flowchart illustrating a method by which a server determines threshold parameters according to various embodiments.

FIG. 6 is a flowchart 600 illustrating a method by which the server 300 determines threshold parameters according to various embodiments.

Referring to FIG. 6, in operation 601, the processor 330 may receive information on a first template related to a second pattern from a plurality of external electronic devices through the communication interface 310 in an embodiment. For example, the processor 330 may receive the information on the first template generated by each of the plurality of external electronic devices from each of the plurality of external electronic devices through the communication interface 310.

In an embodiment, [Table 8] below may show the information on the first template received from the plurality of external electronic devices.

TABLE 8

| First identifier | Time interval | Condition | Action | same_device | delay | n_all |
|---|---|---|---|---|---|---|
| A | 5 minutes | ?:? + sensor_?_present | TV_?_switch_on | 0 | Null | 4032 |
| A | 15 minutes | ?:? + sensor_?_present | TV_?_switch_on | 0 | 7 minutes | 1344 |
| A | 30 minutes | ?:? + sensor_?_present | TV_?_switch_on | 0 | 9 minutes | 672 |
| B | 5 minutes | ?:? + sensor_?_present | TV_?_switch_on | 0 | 2 minutes | 4032 |
| B | 15 minutes | ?:? + sensor_?_present | TV_?_switch_on | 0 | 7 minutes | 1344 |
| B | 30 minutes | ?:? + sensor_?_present | TV_?_switch_on | 0 | 9 minutes | 672 |
| C | 5 minutes | ?:? + sensor_?_present | TV_?_switch_on | 0 | 3 minutes | 4032 |
| C | 15 minutes | ?:? + sensor_?_present | TV_?_switch_on | 0 | 7 minutes | 1344 |
| C | 30 minutes | ?:? + sensor_?_present | TV_?_switch_on | 0 | 9 minutes | 672 |
| D | 5 minutes | ?:? + sensor_?_present | TV_?_switch_on | 0 | Null | 4032 |
| D | 15 minutes | ?:? + sensor_?_present | TV_?_switch_on | 0 | 7 minutes | 1344 |
| D | 30 minutes | ?:? + sensor_?_present | TV_?_switch_on | 0 | 9 minutes | 672 |

TABLE 8-continued

| First identifier | n_x | n_y | n_ptns | confidence | lift | RPF | y_confidence |
|---|---|---|---|---|---|---|---|
| A | 7 | 38 | 0 | 0.00 | 0.0 | 0.00 | 0.3 |
| A | 7 | 38 | 4 | 0.57 | 20.2 | 11.55 | 0.8 |
| A | 10 | 35 | 8 | 0.80 | 15.4 | 12.29 | 0.8 |
| B | 5 | 24 | 2 | 0.40 | 67.2 | 26.88 | 0.45 |
| B | 6 | 22 | 3 | 0.50 | 30.5 | 15.27 | 0.45 |
| B | 9 | 22 | 4 | 0.44 | 13.6 | 6.03 | 0.45 |
| C | 4 | 64 | 4 | 1.00 | 63.0 | 63.00 | 0.45 |
| C | 5 | 60 | 5 | 1.00 | 22.4 | 22.40 | 0.85 |
| C | 7 | 50 | 6 | 0.86 | 11.5 | 9.87 | 0.85 |
| D | 10 | 24 | 0 | 0.00 | 0.0 | 0.00 | 0.2 |
| D | 10 | 24 | 6 | 0.60 | 33.6 | 20.16 | 0.7 |
| D | 11 | 22 | 7 | 0.64 | 19.4 | 12.37 | 0.81 |

[Table 8] may show information on a first template received by the server 300 from four external electronic devices (for example, external electronic devices corresponding to different four identifier (A, B, C, and D)). However, it is not limited thereto, and the server 300 may receive the information on the first template from at least one external electronic device, the number of which is more or less than four.

In operation 603, the processor 330 may determine predetermined time intervals and threshold parameters, which are related to the second pattern, satisfying a predetermined condition for the first template in an embodiment.

A method of determining the predetermined time intervals and threshold parameters related to the second pattern is described in detail with reference to FIG. 7 below.

Figure 7:
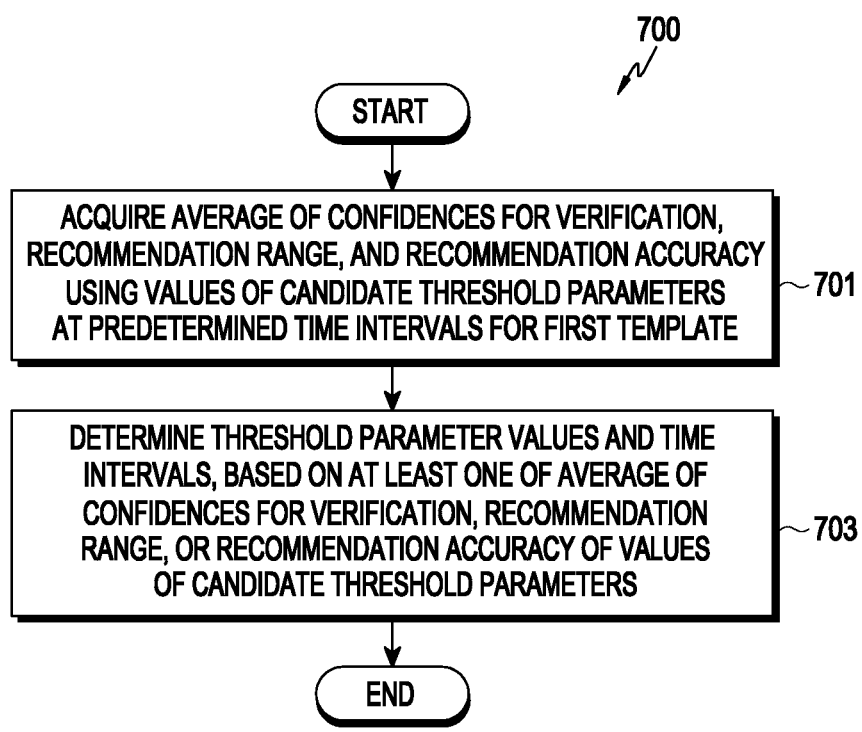
FIG. 7 is a flowchart illustrating a method of determining predetermined time intervals and threshold parameters related to a first pattern according to various embodiments.

FIG. 7 is a flowchart 700 illustrating a method of determining the predetermined time intervals and threshold parameters related to the second pattern according to various embodiments.

Referring to FIG. 7, in operation 701, with respect to the first template, the processor 330 may acquire an average of confidences for verification, a recommendation range, and recommendation accuracy using values of candidate threshold parameters in every time interval in an embodiment.

In an embodiment, [Table 9] below may show the average of confidences for verification, the recommendation range, and the recommendation accuracy acquired on the basis of the first template of [Table 8].

didate threshold n_x, a candidate threshold n_y, a candidate threshold lift, or a candidate threshold RPF.

In an embodiment, the processor 330 may determine candidate threshold parameters among the parameters (for example, delay, n_x, n_y, n_ptns, confidence, lift, and RPF) through a predetermined algorithm (or an artificial neural network). In an embodiment, the processor 330 may determine candidate threshold parameters among the parameters (for example, delay, n_x, n_y, n_ptns, confidence, lift, and RPF) through multiple linear regression analysis. For example, the processor 330 may configure a dependent variable of multiple linear regression analysis as the recommendation range (for example, coverage of [Table 9]) and configure an independent variable as at least one of the parameters (for example, delay, n_x, n_y, n_ptns, confidence, lift, and RPF). The processor 330 may determine, as the candidate threshold parameters, parameters of independent variables having a p value (p-value) equal to or smaller than a predetermined value (for example, 0.05) among the independent variables.

In an embodiment, the processor 330 may determine the number (n_recommend) of first identifiers having a parameter value larger than or equal to a value of a candidate threshold parameter in every predetermined time interval, an average (ave(y_confidence)) of confidence for verification of the first identifier having the parameter value larger than or equal to the value of the candidate threshold parameter (hereinafter, referred to as an "average of confidences for

TABLE 9

| Time interval | Candidate threshold n_ptns | Candidate threshold confidence | ave(y_confidence) | n_recommend | coverage | n_success | accuracy |
|---|---|---|---|---|---|---|---|
| 5 minutes | 0 | 0 | 0.35 | 4 | 100% | 0 | 0% |
| 15 minutes | 0 | 0 | 0.7 | 4 | 100% | 3 | 75% |
| 30 minutes | 0 | 0 | 0.7275 | 4 | 100% | 3 | 75% |
| 5 minutes | 4 | 0.5 | 0.45 | 1 | 25% | 0 | 0% |
| 15 minutes | 4 | 0.5 | 0.783333 | 3 | 75% | 3 | 100% |
| 30 minutes | 4 | 0.5 | 0.82 | 3 | 75% | 3 | 100% |
| 5 minutes | 4 | 0.6 | 0.45 | 1 | 25% | 0 | 0% |
| 15 minutes | 4 | 0.6 | 0.775 | 2 | 50% | 2 | 100% |
| 30 minutes | 4 | 0.6 | 0.82 | 3 | 75% | 3 | 100% |

The processor 330 may include a candidate threshold n_ptns and a candidate threshold confidence as candidate threshold parameters in [Table 9]. However, the candidate threshold parameters are not limited to the candidate threshold n_ptns and the candidate threshold confidence. In an embodiment, the candidate threshold parameters may include at least one of a candidate threshold delay, a can-verification"), a ratio (coverage) of the number of first identifiers having the parameter value larger than or equal to the value of the candidate threshold parameter to the total number of first identifiers registered in the service providing patterns (hereinafter, referred to as a "recommendation range"), the number (n_success) of first identifiers having a confidence value larger than a predetermined value (for example, 0.5) of confidence for verification among first identifiers having the parameter value larger than or equal to the value of the candidate threshold parameter, and a ratio (accuracy) of the number (n_success) of first identifiers having the value of confidence for verification larger than or equal to the predetermined value (for example, 0.5) among the first identifiers having the parameter value larger than or equal to the value of the candidate threshold parameter to the number (n_recommend) of first identifiers having the parameter value larger than or equal to the value of the candidate threshold parameter (hereinafter, referred to as "recommendation accuracy).

For example, referring to [Table 8] and [Table 9], when the time interval is 15 minutes, the candidate threshold n_ptns is 4, and the candidate threshold confidence is 0.6, the processor 330 may identify that n_ptns (5) and confidence (1.00) of a first identifier C and n_ptns (6) and confidence (0.6) of a first identifier D among n_ptns and confidences of first identifiers A to D corresponding to 15 minutes of the time interval in [Table 8] are larger than or equal to the candidate threshold n_ptns 4 and the candidate threshold confidence 0.6. The processor 330 may calculate an average value (0.775) of confidence for verification as an average value of y_confidence (0.85) of the first identifier C and y_confidence (0.7) of the first identifier D corresponding to 15 minutes of the time interval. The processor 330 may calculate that the number of first identifiers (for example, the first identifier C and the first identifier D) having a parameter value larger than or equal to the candidate threshold n_ptns 4 and the candidate threshold confidence 0.6 is 2. When the total number of first identifiers registered in the service providing patterns is 4, the processor 330 may calculate that the ratio (coverage) of the number of first identifiers having the parameter value larger than or equal to the value of the candidate threshold parameter is 50% (for example, 2/4). The processor 330 may calculate that the number (n_success) of first identifiers having the value of confidence for verification larger than a predetermined value (for example, 0.5) of confidence for verification among the first identifiers having the parameter value larger than or equal to the candidate threshold parameter is 2. The processor 330 may calculate the recommendation accuracy 100% (for example, 2/2) as the radio of n_success (for example, 2) to calculated n_recommend (for example, 2).

In an embodiment, with respect to random values of candidate threshold parameters, the processor 330 may acquire an average of confidences for verification, a recommendation range, and recommendation accuracy. For example, the processor 330 may configure values of the candidate threshold n_ptns as 0 and 4 and configure values of the candidate threshold confidence as 0, 0.5, and 0.6 With respect to each of the combinations of the values of candidate threshold n_ptns and the values of the candidate threshold confidence, the processor 330 may acquire an average of confidences for verification, a recommendation range, and recommendation accuracy. [Table 9] shows the case in which the value of the candidate threshold n_ptns are configured as 0 and 4 and the values of the candidate threshold confidence are configured as 0, 0.5, and 0.6, but is not limited thereto, and various random values of candidate threshold parameters may be configured.

In operation 703, the processor 330 may determine values of threshold parameters and time intervals (for example, the time interval of the second pattern) on the basis of at least one of the average of confidences for verification, the recommendation range, or the recommendation accuracy among the values of the candidate threshold parameters in an embodiment.

In an embodiment, the processor 330 may determine, as the value of the threshold parameter, a value of a candidate threshold parameter of a predetermined time interval having a highest recommendation range to calculate the average of confidences for verification (for example, value of confidence for verification) larger than or equal to a predetermined value (for example, 0.7) and recommendation accuracy larger than or equal to a predetermined value (for example, a predetermined ratio) (for example, 75%) among values of candidate threshold parameters of the predetermined time intervals.

In an embodiment, when the number of values of candidate threshold parameters of the predetermined time interval having the highest recommendation range to calculate the average of confidences for verification (for example, value of confidence for verification) larger than or equal to a predetermined value (for example, 0.7) and recommendation accuracy larger than or equal to a predetermined value (for example, a predetermined ratio) (for example, 75%) among values of candidate threshold parameters of the predetermined time intervals is plural, the processor 330 may determine, as the value of the threshold parameter, a value of a candidate threshold parameter having a large value of the candidate threshold parameter. For example, the processor 330 may identify 4 of the value of the candidate threshold n_ptns and 0.5 of the value of the candidate threshold confidence corresponding to 30 minutes of the predetermined time interval and 4 of the value of the candidate threshold n_pts and 0.6 of the value of the candidate threshold confidence to calculate the average of confidences for verification (for example, value of confidence for verification) larger than or equal to the predetermined value (for example, 0.7) and the recommendation accuracy larger than or equal to the predetermined value (for example, predetermined ratio) (for example, 75%) in [Table 9]. The processor 330 may determine, as the value of the threshold parameter, the candidate threshold confidence 0.6 having a larger value of the candidate threshold confidence and the candidate threshold n_ptns 4 among 4 of the value of the candidate threshold n_ptns and 0.5 of the value of the candidate threshold confidence corresponding to 30 minutes of the predetermined time interval and 4 of the value of the candidate threshold n_ptns and 0.6 of the value of the candidate threshold confidence corresponding to 30 minutes of the predetermined time interval. The processor 330 may determine 30 minutes of the time interval corresponding to the determined value of the threshold parameter as the time interval (or final time interval).

Returning to FIG. 6, in operation 605, the processor 330 may transmit the second pattern, the predetermined time interval (for example, the predetermined time interval of the second pattern), and the threshold parameter (for example, the value of the threshold parameter) to a plurality of external electronic devices through the communication interface 310 in an embodiment.

In an embodiment, the processor 330 may transmit a second pattern (for example, the second pattern corresponding to the threshold parameter) (for example, a combination of the condition (?:?+sensor_?_present) and the action (TV_?_switch_on) in [Table 9]), a predetermined time interval (for example, the final time interval determined in operation 703), and a threshold parameter (for example, the value of the threshold parameter determined in operation 703) to all external electronic devices registered in the service providing patterns through the communication interface 310. For example, even when information on the first template related to the second pattern is received from a plurality of first external electronic devices as portions of all external electronic devices registered in the service providing patterns in operation 601, the processor 330 may transmit a second pattern, a predetermined time interval, and a threshold parameter to all external electronic devices registered in the service providing patterns through the communication interface 310.

Figure 8:
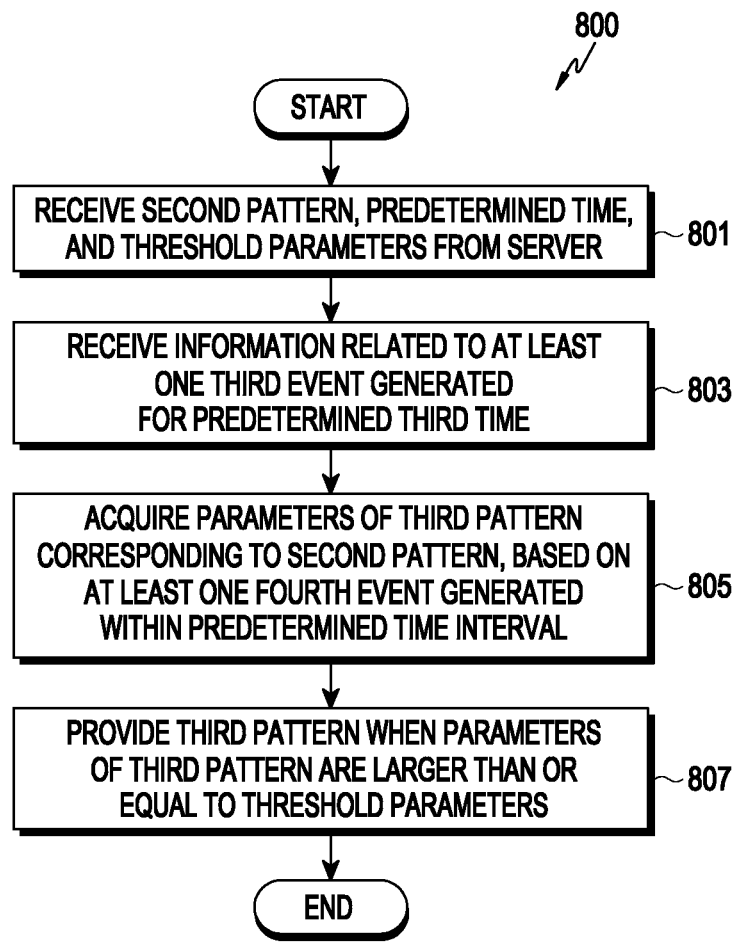
FIG. 8 is a flowchart illustrating a method by which an electronic device provides a method providing patterns according to various embodiments.

FIG. 8 is a flowchart 800 illustrating a method by which the electronic device 200 provides patterns according to various embodiments.

In an embodiment, FIG. 8 may be a flowchart illustrating a method by which the electronic device 200 receives a second pattern, a predetermined time interval (for example, the predetermined time interval of the second pattern), and a threshold parameter from the server 300 and then recommends a third pattern corresponding to the second pattern.

In an embodiment, the electronic device 200 performing the operations of FIG. 8 may be the same as or different from the electronic device transmitting information on the template to the server 300 of FIG. 4. For example, the server 300 may transmit the second pattern, the predetermined time interval, and the threshold parameter to all electronic devices registered in the service providing patterns. Even an electronic device which has not transmitted information on the template to the server 300 may receive the second pattern, the predetermined time interval, and the threshold parameter from the server 300. The electronic device receiving the second pattern, the predetermined time interval, and the threshold parameter from the server 300 may perform the operations of FIG. 8.

In operation 801, the processor 240 may receive the second pattern, the predetermined time interval (for example, the predetermined time interval of the second pattern), and the threshold parameter related to the second pattern from the server 300 through the communication interface 210 in an embodiment.

In operation 803, the processor 240 may receive information related to at least one third event generated by at least one external electronic device for a predetermined third time from at least one external electronic device through the communication interface 210 in an embodiment.

The electronic device 200 and at least one external electronic device may be electronic devices registered in the service providing patterns. For example, the electronic device 200 and at least one external electronic device may be electronic devices registered in the service providing patterns (or service for integratively or individually managing (or controlling) at least one electronic device located within home).

In an embodiment, information on at least one third event may include at least one piece of information on a state within the home (or a change in the state within the home) received from at least one external electronic device (for example, sensor) communication-connected with the electronic device 200 and information on the operation of at least one external electronic device (or a change in the operation of at least one external electronic device) received from at least one external electronic device (for example, home appliances) communication-connected with the electronic device 200.

In an embodiment, information on at least one third event may include information on a time at which the event is generated by at least one external electronic device as well as the information related to the event (for example, information on the state within the home or information on the operation of at least one external electronic device).

In an embodiment, the predetermined third time (or the size of the predetermined third time) may be the same as or different from at least one of the predetermined first time or the predetermined second time. In an embodiment, the third time is a time after the predetermined second time and may refer to a time before a predetermined time from the present.

FIG. 8 illustrates that operation 801 is performed earlier than operation 803, but is not limited thereto. For example, operation 803 may be performed earlier than operation 801.

In an embodiment, [Table 10] below may show information related to at least one third event generated by at least one external electronic device for a predetermined third time.

TABLE 10

| Time at which event is generated | Device type | Device ID | Capability | Capability value |
|---|---|---|---|---|
| 2020-07-29 16:11:22 | TV | xxx1 | switch | on |
| 2020-07-30 16:14:22 | sensor (for example, presence detection sensor) | xxx0 | presence | present |
| 2020-07-31 16:12:22 | TV (television) | xxx1 | switch | on |
| 2020-07-31 16:12:42 | TV | xxx1 | tvChannel | 11 |
| 2020-07-31 16:15:30 | AC (air conditioner) | xxx2 | switch | on |

In operation 805, the processor 240 may acquire parameters related to the third pattern corresponding to the second pattern on the basis of information on at least one fourth event generated within at least one predetermined time interval among the information on at least one third event in an embodiment.

In an embodiment, the third pattern may refer to a pattern having information which is the same as the second pattern, from which the specific information of the condition and the action is deleted, except for the deleted specific information of the condition and the action and including specific information of conditions and actions. For example, when the second pattern is a combination of the condition (?:?+ sensor_?_present) and the action (TV_?_switch_on), the third pattern may be a combination of the condition (16:10+ sensor_xxx0_present) and an action (TV_xxx1_switch_on). In an embodiment, the predetermined time interval of the third pattern may be the same as the predetermined time interval of the second pattern.

In an embodiment, the processor 240 may acquire a plurality of patterns by performing the operation which is at least partially the same as or similar to the operation described in operation 403 or operation 405 of FIG. 4. The processor 240 may determine the third pattern corresponding to the second pattern (for example, third pattern corresponding to the second pattern and having the same predetermined time interval) among the plurality of acquired patterns. The processor 240 may acquire parameters related to the third pattern on the basis of the third pattern (for example, information related to the third pattern).

In an embodiment, [Table 11] below may show the third pattern acquired on the basis of information related to at least one third event of [Table 10] and parameters related to the third pattern.

TABLE 11

| Time interval | Condition | Action | n_ptns | Confidence | Lift |
|---|---|---|---|---|---|
| 5 minutes | 16:10 | TV_xxx1_switch_on | 2 | 0.67 | 14 |
| 30 minutes | TV_xxx1_switch_on | AC_xxx2_switch_on | 1 | 0.5 | 6 |

In an embodiment, [Table 11] may show the third pattern acquired when the second pattern received from the server 300 includes the pattern (a combination of the condition (?:?) and the action (TV_?_switch_on)) and the pattern (a combination of the condition (TV_?_switch_on) and the action (AC_?_switch_on)).

In operation 807, the processor 240 may provide (for example, recommend) the third pattern when the parameter of the third pattern is larger than or equal to a threshold parameter in an embodiment.

In an embodiment, [Table 12] below may show the third pattern, parameters of the third pattern, and threshold parameters acquired on each date.

TABLE 12

| Current date | Condition | Action | n_ptns | Confidence | Lift | Threshold n_ptns | Threshold confidence | Threshold lift | Time interval |
|---|---|---|---|---|---|---|---|---|---|
| 2020 Aug. 1 | 16:10 | TV_xxx1_switch_on | 8 | 0.72 | 8 | ≥9 | ≥0.7 | ≥5 | 5 minutes |
| | TV_xxx1_switch_on | AC_xxx2_switch_on | 4 | 0.85 | 4 | ≥6 | ≥0.6 | ≥2 | 30 minutes |
| 2020 Aug. 2 | 16:10 | TV_xxx1_switch_on | 9 | 0.81 | 8 | ≥9 | ≥0.7 | ≥5 | 5 minutes |
| | TV_xxx1_switch_on | AC_xxx2_switch_on | 5 | 0.75 | 4 | ≥6 | ≥0.6 | ≥2 | 30 minutes |
| 2020 Aug. 3 | 16:10 | TV_xxx1_switch_on | 9 | 0.75 | 8 | ≥9 | ≥0.7 | ≥5 | 5 minutes |
| | TV_xxx1_switch_on | AC_xxx2_switch_on | 6 | 0.65 | 4 | ≥6 | ≥0.6 | ≥2 | 30 minutes |

In [Table 12], the threshold parameters related to the third pattern (condition (16:10) and action (TV_xxx1_switch_on)) of 5 minutes of the predetermined time interval may have 9 of the threshold n_ptns, 0.7 of the threshold confidence, and 5 of the threshold lift.

In [Table 12], the threshold parameters related to the third pattern (condition (TV_xxx1_switch_on) and action (AC_xxx2_switch_on)) of 30 minutes of the predetermined time interval may have 6 of the threshold n_ptns, 0.6 of the threshold confidence, and 2 of the threshold lift.

In an embodiment, when the current date is Aug. 1, 2020 in [Table 12] (for example, at least one third event is received from at least one external electronic device for the predetermined third time (for example, 2 weeks) inversely calculated from Aug. 1, 2020), the processor 240 may not recommend the third pattern since n_ptns of the third pattern is smaller than the threshold n_ptns.

In an embodiment, when the current date is Aug. 2, 2020 in [Table 12] (for example, at least one third event is received from at least one external electronic device for the predetermined third time (for example, 2 weeks) inversely calculated from Aug. 2, 2020), the processor 240 may recommend the third pattern since the parameter of the third pattern (for example, a combination of the condition (16:10) and the action (TV_xxx1_switch_on)) is larger than or equal to the threshold parameter.

In an embodiment, when the current date is Aug. 3, 2020 in [Table 12] (for example, at least one third event is received from at least one external electronic device for the predetermined third time (for example, 2 weeks) inversely calculated from Aug. 3, 2020), the processor 240 may recommend the third pattern since the parameter of the third pattern (for example, a pattern (a combination of the condition (16:10) and the action (AC_xxx2_switch_on)) and a pattern (a combination of the pattern (TV_xxx1_switch_on) and the action (AC_xxx2_switch_on))) is larger than or equal to the threshold parameter.

In an embodiment, when the parameter of the third pattern is larger than or equal to the threshold parameter and an event corresponding to the condition of the third pattern is generated, the processor 240 may provide (for example, recommend) the third pattern.

In an embodiment, the processor 240 may display information indicating whether the electronic device 200 configures the third pattern in the electronic device through the display 220 in order to provide the third pattern. However, a method of providing the third pattern is not limited to the above-described example.

In an embodiment, when the third pattern is configured on the basis of a user input, if an event corresponding to the condition of the third pattern is generated, the processor 240 may control at least one external electronic device to generate an event corresponding to the action of the third pattern. For example, when the third pattern (a combination of the condition (16:10) and the action (TV_xxx1_switch_on)) is configured on the basis of a user input, the processor 240 may control the TV such that power of the TV is turned on at 16:10. In another example, when the third pattern (a combination of the condition (16:10) and the action (TV_xxx1_switch_on)) is configured on the basis of a user input, the processor 240 may configure the TV such that power of the TV is turned on at 16:10.

In an embodiment, although not illustrated in FIGS. 4 to 8, when the electronic device 200 receives information on an event from at least one external electronic device communication-connected with the electronic device 200 through the communication interface 210, the electronic device 200 may generate a template through the above-described method and transmit the generated template to the server 300, so that the server 300 may control (or update) threshold parameters. Accordingly, the threshold parameters generated by the server 300 may be controlled according to the information on the template received from the electronic device 200.

FIG. 8 illustrates the case in which the electronic device 200 is an electronic device having a computing capability to perform at least some of the operations providing patterns. When the electronic device 200 is not the electronic device having the computing capability to perform at least some of the operations providing patterns (for example, when all electronic devices registered in the service providing patterns do not have the computing capability to perform at least some of the operations providing patterns), the examples illustrated in FIG. 8 may be performed by the server 300.

Further, a structure of data used in the embodiments of the disclosure may be recorded in a computer-readable recording medium through various means. The computer-readable recording medium includes a magnetic storage medium (for example, a ROM, a floppy disk, and a hard disk) and an optical reading medium (for example, a CD-ROM and a DVD).

The disclosure has been described on the basis of exemplary embodiments thereof. Those skilled in the art can understand that the disclosure can be implemented in a modified form without departing from the essential features of the disclosure. Therefore, the disclosed embodiments should be considered in a descriptive view rather than a limitative view. The scope of the disclosure is defined in the claims rather than the description, and it should be construed that all differences within a range equivalent thereto are included in the disclosure.

Although the present disclosure has been described with various embodiments, various changes and modifications may be suggested to one skilled in the art. It is intended that the present disclosure encompass such changes and modifications as fall within the scope of the appended claims.

The invention claimed is:

1. An electronic device comprising:
a communication interface;
a memory; and
at least one processor functionally connected to the communication interface and the memory,
wherein the at least one processor is configured to:
receive information related to at least one first event generated for a predetermined first time from at least one external electronic device through the communication interface,
acquire a first pattern and a first parameter related to the first pattern, based on information on at least one second event generated within at least one predetermined time interval among the information on the at least one first event,
receive information related to at least one third event generated for a predetermined second time from the at least one external electronic device through the communication interface,
acquire a second parameter related to the first pattern, based on the information related to the at least one third event,
generate a first template, based on the first pattern, the first parameter, and the second parameter, and
transmit information on the first template to a server through the communication interface.

2. The electronic device of claim 1, wherein the at least one processor is configured to:
generate an identifier for the information on the at least one first event, and
transmit the information on the first template including the first template and the identifier to the server through the communication interface.

3. The electronic device of claim 2, wherein the at least one processor is configured to:
acquire a sequence set, based on the at least one second event, in every time interval of the at least one predetermined time interval,
determine a condition and an action of the first pattern, based on the sequence set and a time point which is a reference of the predetermined time interval, and
acquire the first parameter,
wherein the sequence set includes the at least one second event generated within the at least one predetermined time interval, and
wherein the at least one second event is arranged according to a time at which the at least one second event is generated in the sequence.

4. The electronic device of claim 3, wherein the first parameter includes at least one of a support, a confidence, a lift, or a Rule Power Factor (RPF), related to the first pattern, and
wherein the second parameter includes a confidence for verification.

5. The electronic device of claim 1, wherein the at least one processor is configured to:
acquire a second pattern by deleting specific information of the first pattern, and
generate the first template including the second pattern, the first parameter, the second parameter, and the at least one predetermined time interval.

6. A server comprising:
a communication interface;
a memory; and
at least one processor functionally connected to the communication interface and the memory,
wherein the at least one processor is configured to:
receive information on a first template related to a first pattern from a plurality of external electronic devices through the communication interface,
determine a predetermined time interval related to the first pattern and a value of a threshold parameter which satisfy a predetermined condition for the first template, and
transmit the first pattern, the predetermined time interval, and the value of the threshold parameter to the plurality of external electronic devices through the communication interface.

7. The server of claim 6, wherein the information on the first template includes the first pattern from which specific information of a condition and an action is deleted, a first parameter and a second parameter related to the first pattern, at least one predetermined time interval used for acquiring the first pattern, and an identifier of each of the plurality of external electronic devices.

8. The server of claim 7, wherein the at least one processor is configured to acquire an average of confidences for verification, a recommendation range, and recommendation accuracy using values of candidate threshold parameters in every time interval of at least one predetermined time interval for the first template.

9. The server of claim 8, wherein:
- the average of the confidences for verification corresponds to identifiers having a value of the first parameter larger than or equal to the values of the candidate threshold parameters,
- the recommendation range is a ratio of a number of identifiers having the value of the first parameter larger than or equal to the values of the candidate threshold parameters to a total number of identifiers registered in the server, and
- the recommendation accuracy is a ratio of a number of identifiers included in the second parameter and having values of the confidences for verification larger than or equal to a predetermined value among the identifiers having a parameter value larger than or equal to the values of the candidate threshold parameters to the number of identifiers having the value of the first parameter larger than or equal to the values of the candidate threshold parameters.

10. The server of claim 9, wherein the at least one processor is configured to determine the value of the threshold parameter and the predetermined time interval, based on at least one of the average of the confidences for verification, the recommendation range, or the recommendation accuracy among the values of the candidate threshold parameters.

11. The server of claim 10, wherein the at least one processor is configured to determine, as the value of the threshold parameter, values of the candidate threshold parameters having highest recommendation ranges among the values of the candidate threshold parameters to calculate the average of the confidences for verification larger than or equal to a predetermined value and the recommendation accuracy larger than or equal to a predetermined value.

12. An electronic device comprising:
- a communication interface;
- a memory; and
- at least one processor functionally connected to the communication interface and the memory,
- wherein the at least one processor is configured to:
  - receive a first pattern, a predetermined time interval related to the first pattern, and a value of a threshold parameter related to the first pattern from a server through the communication interface,
  - receive information related to at least one first event generated for a predetermined first time from at least one external electronic device through the communication interface,
  - acquire a first parameter related to a second pattern corresponding to the first pattern, based on at least one second event generated within the predetermined time intervals among the at least one first event, and
  - provide the second pattern when the value of the first parameter is larger than or equal to the value of the threshold parameter.

13. The electronic device of claim 12, wherein the first pattern is a pattern from which specific information of a condition and an action is deleted, and
- wherein the second pattern has information which is equal to the first pattern except for the deleted specific information of the condition and the action and includes specific information of conditions and actions acquired based on the at least one second event.

14. The electronic device of claim 13, wherein the at least one processor is configured to:
- display information indicating whether to configure the second pattern through a display of the electronic device when the first parameter is larger than or equal to the threshold parameter, and
- control the at least one external electronic device to perform an event configured as an action of the second pattern if an event configured as a condition of the second pattern is generated when the second pattern is configured.

15. The electronic device of claim 13, wherein, when the value of the first parameter is larger than or equal to the value of the threshold parameter and an event corresponding to a condition of the second pattern is generated, the at least one processor is configured to display information indicating whether to configure the second pattern through a display of the electronic device.

* * * * *